United States Patent [19]

Powell

[11] Patent Number: 5,631,778
[45] Date of Patent: May 20, 1997

[54] PANORAMIC FISH-EYE IMAGING SYSTEM

[75] Inventor: Ian Powell, Gloucester, Canada

[73] Assignee: National Research Council of Canda, Ottawa, Canada

[21] Appl. No.: 585,693

[22] Filed: Jan. 16, 1996

[30] Foreign Application Priority Data

Apr. 5, 1995 [CA] Canada .................................. 2146406

[51] Int. Cl.⁶ .......................... G02B 13/06; G02B 17/00
[52] U.S. Cl. .......................... 359/724; 359/725; 359/731
[58] Field of Search .................................. 359/724, 725, 359/731

[56] References Cited

U.S. PATENT DOCUMENTS

| 2,638,033 | 5/1953 | Buchele et al. | 359/725 |
|---|---|---|---|
| 3,552,820 | 1/1971 | Brachvogel | 359/364 |
| 3,711,184 | 1/1973 | Amon et al. | 359/731 |
| 4,012,126 | 3/1977 | Rosendahl et al. | 359/725 |
| 4,256,373 | 3/1981 | Horimoto | 359/755 |
| 4,395,093 | 7/1983 | Rosendahl et al. | 359/725 |
| 4,412,726 | 11/1983 | Horimoto | 359/752 |
| 4,484,801 | 11/1984 | Cox | 359/725 |
| 4,566,763 | 1/1986 | Greguss | 359/725 |
| 5,471,346 | 11/1995 | Ames | 359/731 |
| 5,502,592 | 3/1996 | Jamieson | 359/725 |

FOREIGN PATENT DOCUMENTS 0051969  5/1982  European Pat. Off. ................ 359/731

Primary Examiner—Georgia Y. Epps
Assistant Examiner—Evelyn A. Lester
Attorney, Agent, or Firm—Juliusz Szereszewski

[57] ABSTRACT

A new panoramic/fish-eye imaging system for projecting a 360 degree cylindrical field of view onto a two-dimensional annular format is described. It is rotationally symmetrical and comprises two groups of optics, each having very distinct functions. The front group of optics is basically a catoptric system employing a concave and convex mirror for converting the extreme field angles to a more manageable intermediate image. The rear group acts as a relay lens to transfer the intermediate image formed by the front group to some accessible location downstream. For improved overall performance, aberration compensation of the front group is included in the design of the relay optics. A further refinement to the design is the inclusion of an additional optical element in the form of refracting negative shell located in front of the entire arrangement. This increases the effective field of view and is useful when fields of view exceeding 180 degrees are required.

6 Claims, 4 Drawing Sheets

PANORAMIC FISH-EYE IMAGING SYSTEM

FIELD OF THE INVENTION

This invention relates to a panoramic/fish-eye imaging system for projecting a 360 degree cylindrical field of view onto a two dimensional annular format.

BACKGROUND OF THE INVENTION

There are many presently known panoramic and fish-eye viewing optical arrangements which use lenses, or optical blocks, of various shapes. Examples of panoramic arrangements are described in U.S. Pat. No. 2,638,033 to Buchele et al; U.S. Pat. No. 3,552,820 to Brachvogel; U.S. Pat. No. 4,395,093 to Rosendahl et al; U.S. Pat. No. 4,484,801 to Cox: U.S. Pat. No. 4,566,763 to Greguss, while examples of fish-eye systems are described in U.S. Pat. Nos. 4,256,373 and 4,412,726 both to Horimoto.

Further, an arrangement consisting of a concave reflecting surface and a convex reflecting surface facing each other is known as a Schwarzschild system.

Each of these has its own advantages and disadvantages. While both the more conventional fish-eye lens and the panoramic block arrangement might work satisfactorily for certain applications, their use becomes problematic when attempting to design an optical system which has both a large image format and a large backworking distance. For example when a panoramic arrangement is appropriately scaled up for handling the larger image format, the size of the block becomes not only bulky but depending on the material could be extremely expensive to produce, thus making the panoramic block a less than attractive solution. As for the fish-eye lens, since the focal length associated with it tends to be small compared to its size in order to obtain the proper object to image mapping, obtaining sufficient backworking distance is usually at the expense of greater complexity and performance. While a ratio of backworking distance to focal length in the region of 2:1 is not uncommon, increasing this to 3:1 imposes a severe burden on the design.

SUMMARY OF THE INVENTION

A new panoramic/fish-eye imaging system for projecting a 360 degree cylindrical field of view onto a two-dimensional annular format is described. It is rotationally symmetrical and comprises two groups of optics, each having very distinct functions. The front group of optics is basically a catoptric system employing a concave and convex mirror for the converting of the extreme field angles to a more manageable intermediate image. The rear group acts as a relay lens to transfer the intermediate image formed by the front group to some accessible location downstream. For improved overall performance, aberration compensation of the front group is included in the design of the relay optics. A further refinement to the design is the inclusion of an additional optical element in the form of refracting negative shell located in front of the entire arrangement. This increases the effective field of view and is useful when fields of view exceeding 180 degrees are required.

According to the invention, there is provided a panoramic fish-eye imaging system having a rotational axis of symmetry and comprising a first, concave reflecting surface and a second, convex reflecting surface which are disposed along the rotational axis of symmetry and face each other, the first reflective surface having a central hole defining an aperture stop, the system further having an entrance pupil located between said surfaces, the surfaces having an optical power and being disposed such as to enable a light ray bundle to enter through said entrance pupil, to undergo reflection from the first reflective surface, the second reflective surface, and exit through the central hole thereby to produce an annular image from a cylindrical field of view around the rotational axis of symmetry. The system may have at least one refracting corrector optical element located in a proximity to the central hole in the concave mirror, said corrector element having aberration properties such as to compensate for a residual aberration of the system.

Further, the system may comprise a refracting shell located in front of said convex reflective surface along the rotational axis of symmetry, said shell having a negative power to allow fields of view greater than 180 degrees to be imaged.

DESCRIPTION OF THE INVENTION

It is an object of this invention to provide a panoramic/fish-eye lens system for imaging of a cylindrical 360 degree field of view onto a two dimensional annular format. The system described here is especially useful when both image format and backworking distance are large.

The panoramic/fish-eye imaging system for projecting a 360 degree cylindrical field of view onto a two-dimensional annular format described here is rotationally symmetrical and comprises two groups of optics, each having very distinct functions to accomplish the above-defined objective. The front group of optics is basically a catoptric system employing a concave and convex mirror for converting the extreme field angles to a more manageable intermediate image. The central region of the field of view is blocked by a combination of the presence of the smaller convex mirror and the central hole in the larger concave mirror. The hole is necessary to allow the radiation to exit uninterruptedly from the system. The entrance pupil associated with the arrangement is located roughly equidistantly from the two mirrors and the exit pupil, an actual physical stop, in the vicinity of the hole in the concave mirror. Improvement in the aberration balance of this front group can be obtained using a refracting corrector optical element located close to said hole. Because the image presented to the outside world by this two mirror combination is virtual in nature, in order to gain access to it, it is necessary to follow this first group with some relay lens. It is a relatively trivial task to include the same aberration balance in this relay optics. A refinement to the overall design is the inclusion of an additional optical element in the form of refracting negative shell located in front of the entire arrangement. This increases the effective field of view and is useful when fields of view exceeding 180 degrees are required.

Figure 1:
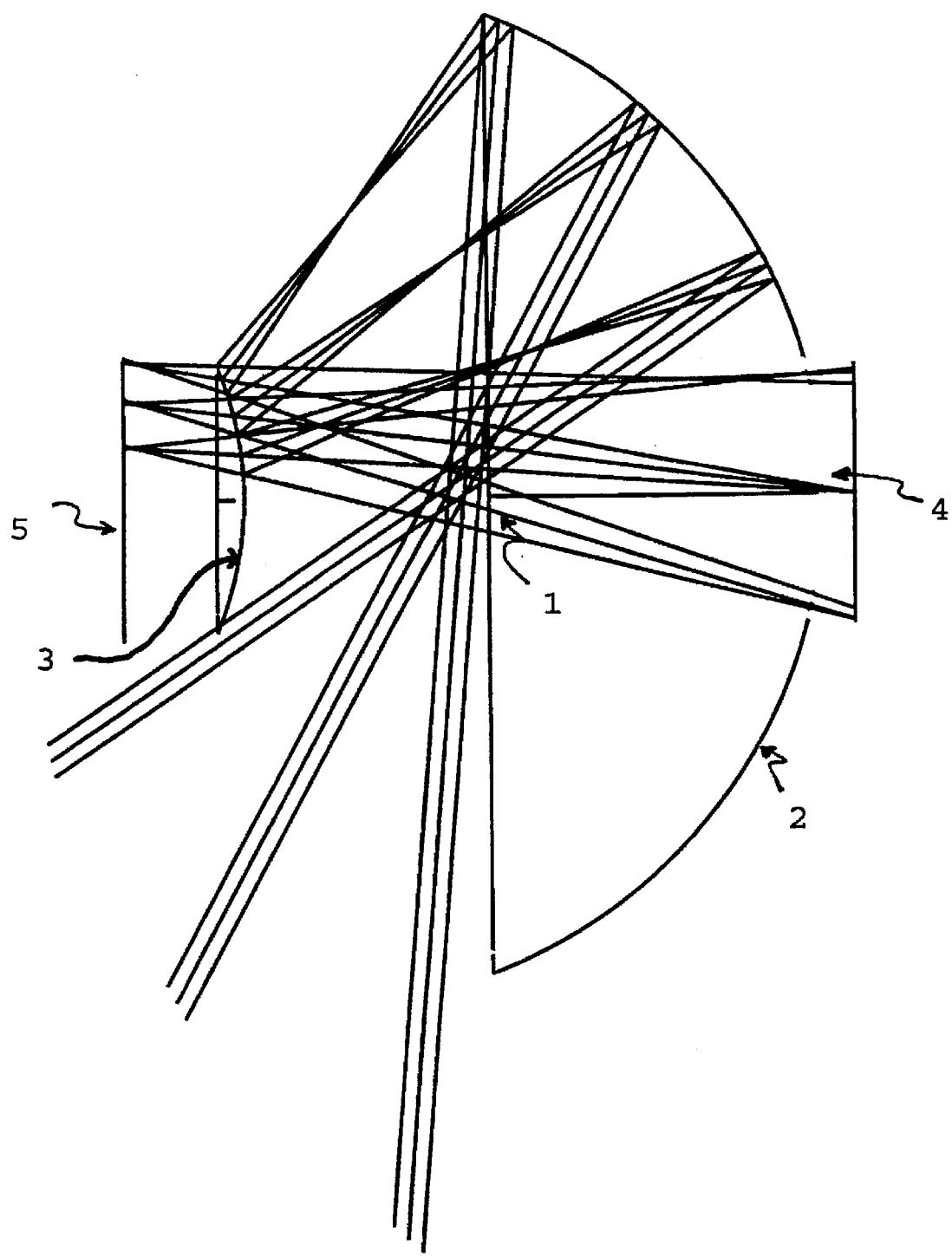
FIG. 1 is a sectional side view of an embodiment of the panoramic/fish-eye arrangement in its simplest form.

For the fish-eye arrangement, where the field of view is limited to something less than 180 degrees, the construction of the optics can take the form of a concave mirror followed by a convex mirror as illustrated in FIG. 1. Referring to this figure, ray bundles from a large field of view pass through entrance pupil 1 of the system, undergo a first reflection at concave surface 2, a second reflection at convex surface 3 and exit through hole 4 in concave mirror 2. Virtual image 5 is presented to the outside world. In the example illustrated, radii of curvature are, respectively, 85.82 mm for the concave reflecting surface 2 and 59.14 mm for the convex surface 3. The surfaces are separated by a distance of 97.93 mm. The surfaces are not aspherized in this embodiment. Improved overall aberration correction of the system is possible if these surfaces are aspherized.

Figure 2:
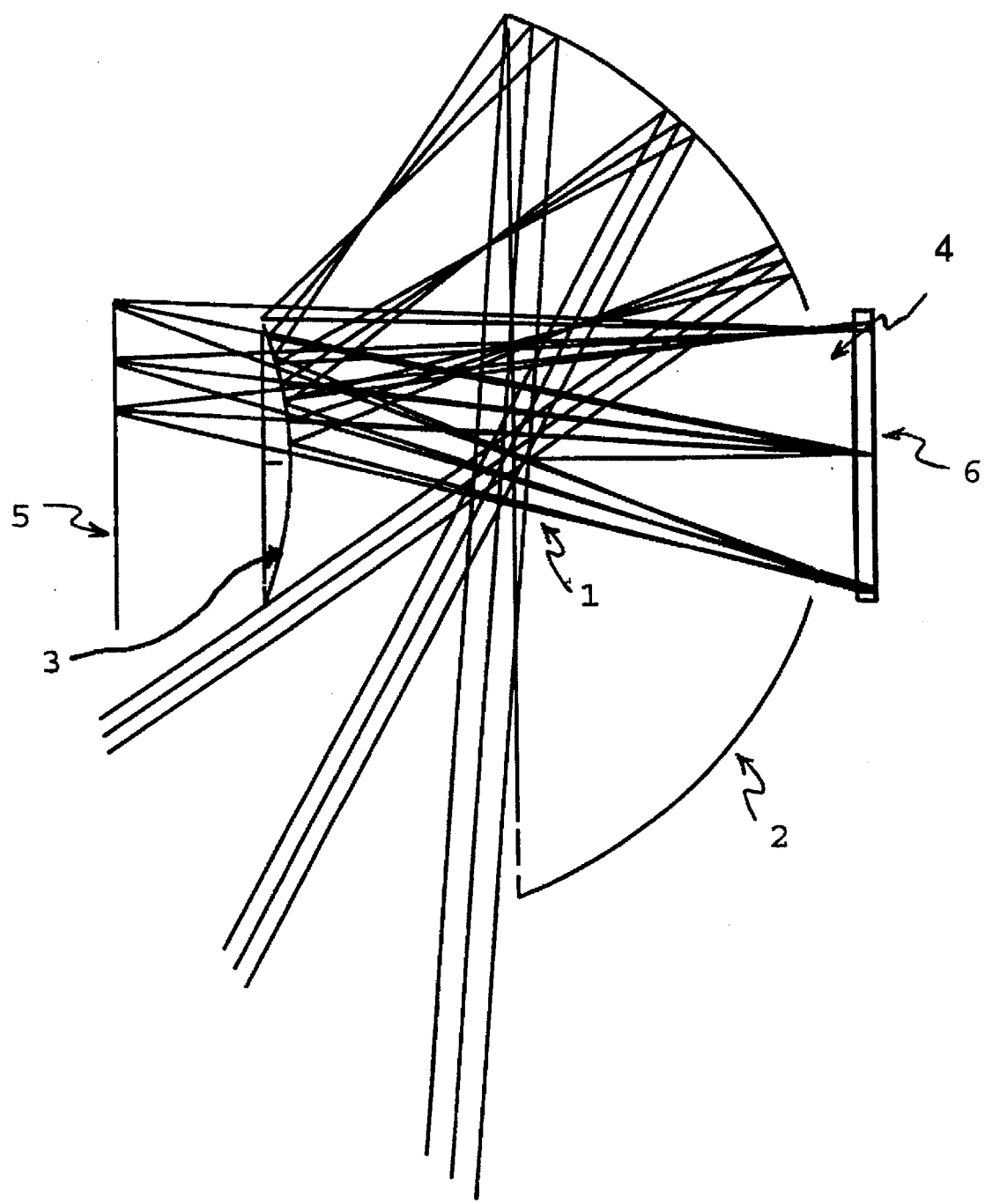
FIG. 2 is a sectional side view of the first embodiment in combination with a refracting corrector optical element.

The configuration is rotationally symmetrical with the mirrors arranged and having the appropriate powers so as to enable light ray bundles over a large range of angles entering from an entrance pupil located roughly half way between the two mirrors to reflect from them and exit the system through a hole in the concave mirror. It can be appreciated that the two mirror combination has two important functions; it caters not only to ordinary object/image imagery but also to pupil imagery. It can be seen from the schematic that the physical stop of the system, for convenience located in close proximity to the exit aperture, is imaged upstream in a well defined state about half way between the two mirrors. Allowing the reflective surfaces to take on aspherical shapes improves the aberration correction. Additional aberration correction can be obtained by introducing a refracting optical element at the exit face of the system as depicted in FIG. 2. This element can also be aspherized for improved performance. Referring to FIG. 2, ray bundles from a large field of view pass through entrance pupil 1 of the system undergo, a first reflection at concave mirror 2, a second reflection at convex mirror 3 and pass finally through refracting optical element(s) 6 located in close proximity to hole 4 in concave mirror 2. Virtual image 5 is presented to the outside world. It should be noted that as with the example illustrated in FIG. 1, improvement in performance can be obtained if the surfaces are aspherized.

Figure 3:
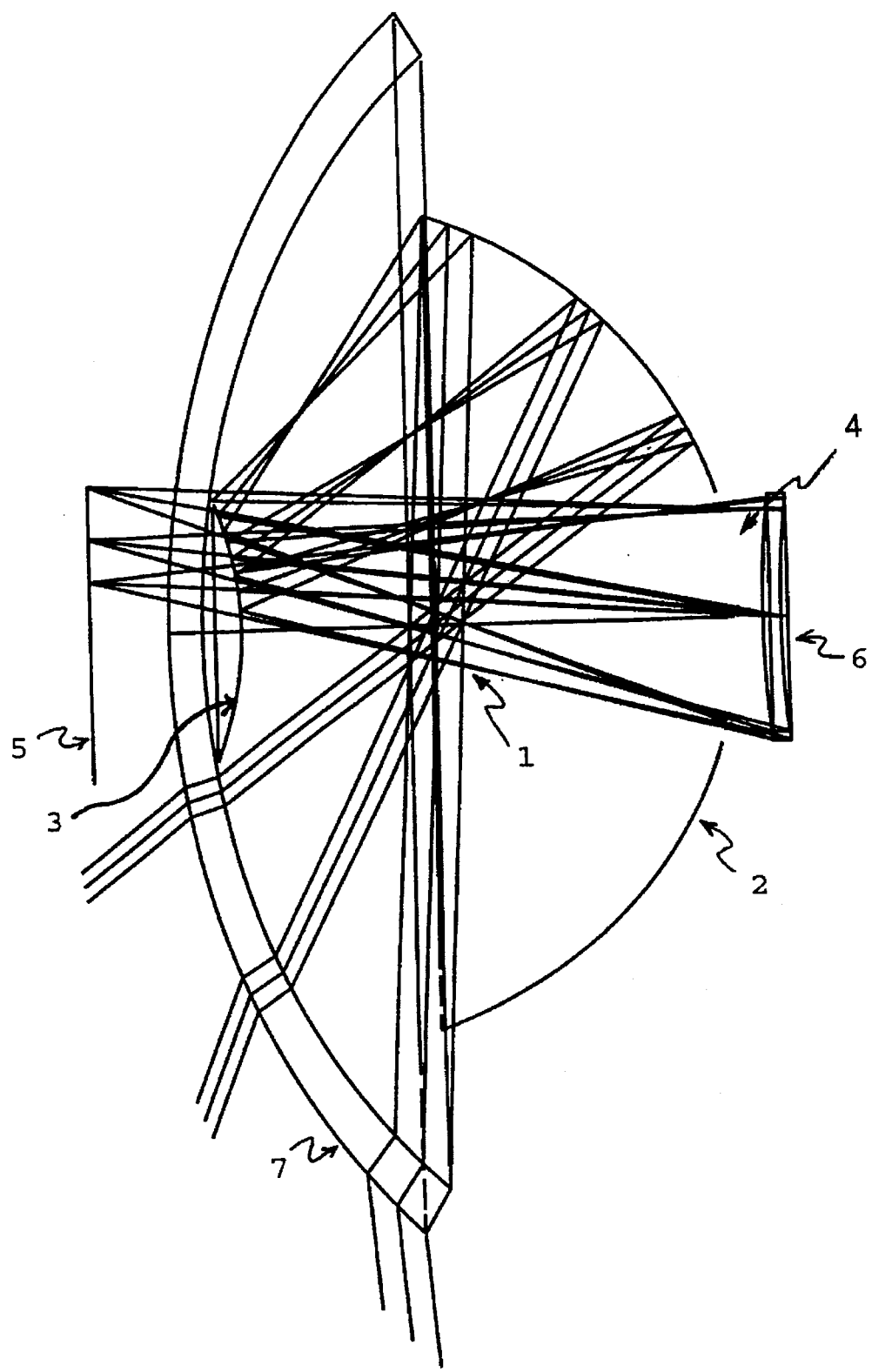
FIG. 3 is a sectional side view of the first embodiment in combination with a refracting negative shell out front.

A further refinement to this arrangement is to include a refracting shell near to the convex mirror, converting the fish-eye optics into a true panoramic lens. Allowing this meniscus element to have a certain amount of negative power would increase the effective field of view in the object space. The function of this element is simply to redirect the extreme rays so that on refraction they proceed in a direction along the optical axis rather than opposed to it. FIG. 3 depicts such an arrangement whereby a field of view in the object space extending from +/−35 to +/−95 degrees is imaged into the space between the two mirrors. After reflection from the second mirror the image becomes virtual with the imaging ray bundles diverging towards the refracting corrector lens element. Referring to FIG. 3, ray bundles from a large field of view undergo refraction at the front shell 7, pass through entrance pupil 1, undergo a first reflection at concave mirror 2, a second reflection at convex mirror 3 and finally pass through refracting optical element (s) 6 located in close proximity to hole 4 in concave mirror 2. Virtual image 5 is presented to the outside world. It should be noted that as with the example illustrated in FIG. 1, improvement in performance can be obtained if the surfaces are aspherized.

Because of the inaccessibility of the image location, relay optics are required to reimage the image to some more convenient location downstream from the optics. The same amount of aberration correction is built into this lens as would have been included in the refracting compensator. Obviously gaussian properties associated with this lens group have to tie in with the application and the optics upstream from it. A convenient arrangement would be for the relay optics to operate at 2:1 demagnification with the appropriate focal length.

Figure 4:
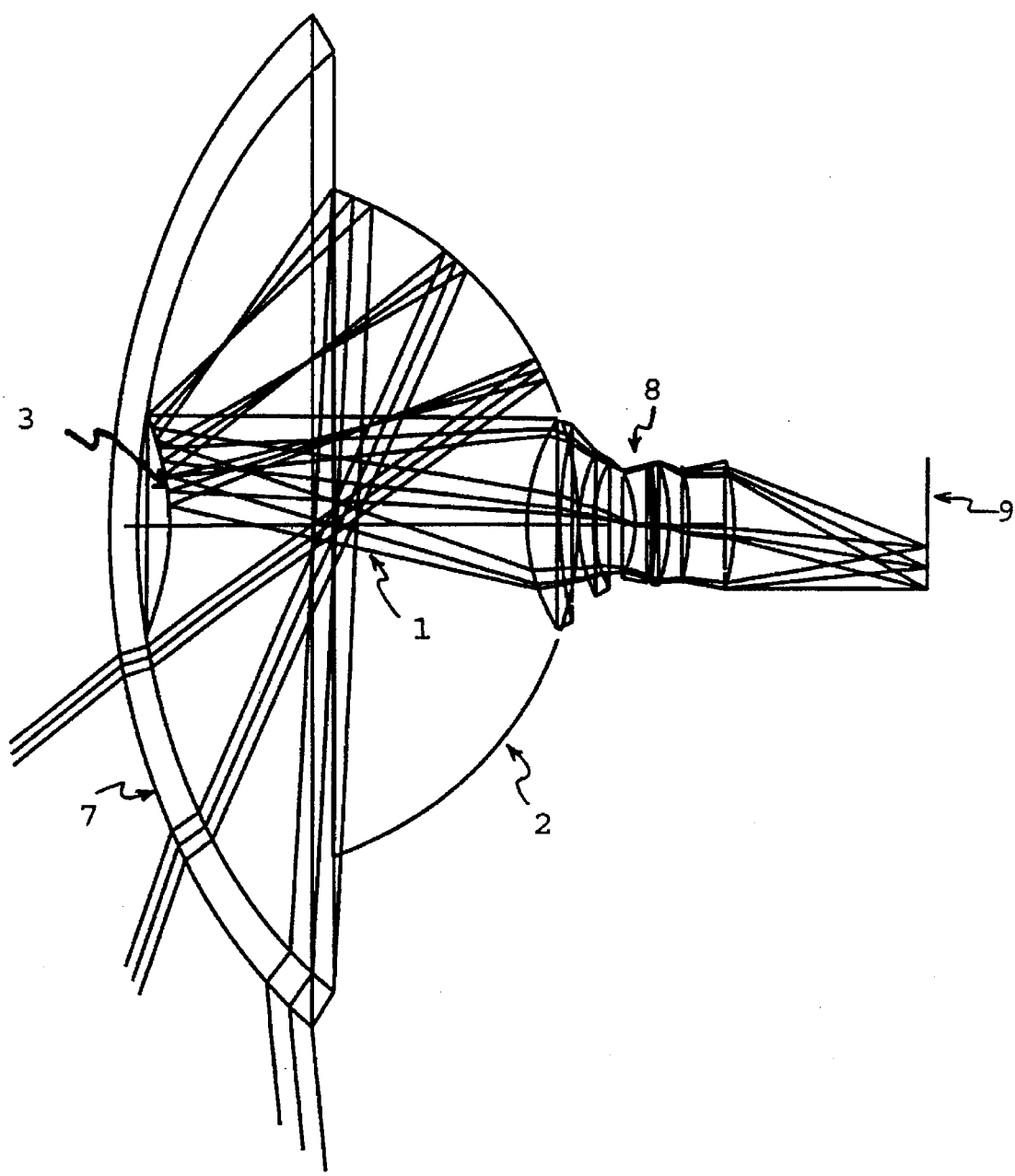
FIG. 4 is a sectional side view of the first embodiment in combination with a refracting negative shell out front and a typical relay optical system.

An obvious application for such a panoramic/fish-eye lens would be in connection with infrared cameras where large fields of view and backworking distances are simultaneously required. An example of a complete optical system is illustrated in FIG. 4. Referring to this figure, ray bundles from a large field of view undergo refraction at the front shell 7, pass through entrance pupil 1, undergo a first reflection at concave mirror 2, a second reflection at convex mirror 3 and are finally intercepted by relay optics 8 to form a real image 9 at some convenient distance downstream. It should be noted that as with the example illustrated in FIG. 1, improvement in performance can be obtained if the surfaces are aspherized.

The system which is working at an aperture equivalent to f/1.4 comprises the mirror shell assembly followed by the relay optics with a demagnification of 2:1. The effective focal length of the overall system is half that of the front group and maps the extreme field of view of +/−95 degrees onto a large circular format, about 25 mm in diameter. The actual volume of the material used for the shell can be seen not to be excessive and the backworking distance is large.

I claim:

1. A panoramic fish-eye imaging system having a rotational axis of symmetry and comprising a first, concave reflecting surface and a second, convex reflecting surface which are disposed along the rotational axis of symmetry and face each other, the first reflective surface having a central hole defining an aperture stop, the system further having an entrance pupil located between said surfaces, the surfaces having an optical power and being disposed such as to enable a light ray bundle to enter through said entrance pupil, to undergo reflection from the first reflective surface, the second reflective surface, and exit through the central hole thereby to produce an annular image from a cylindrical field of view around the rotational axis of symmetry.

2. A panoramic/fish-eye imaging system according to claim 1, further comprising at least one refracting corrector optical element located in a proximity to the central hole in the concave reflecting surface, said corrector element having aberration properties such as to compensate for a residual aberration of the system.

3. The imaging system according to claim 1, further comprising a refracting shell located in front of said convex reflective surface along the rotational axis of symmetry, said shell having a negative power to allow fields of view greater than 180 degrees to be imaged.

4. The imaging system according to claim 1, further comprising a refracting shell having negative power to allow fields of view greater than 180 degrees to be imaged and a refracting corrector optical element located in close proximity to the hole in the concave reflecting surface.

5. The imaging system according to claim 1, further comprising relay optics located in close proximity to the central hole in the concave reflecting surface to enable a real image to be formed at an accessible location downstream.

6. The imaging system according to claim 5, further comprising a refracting shell having negative power to allow fields of view greater than 180 degrees to be imaged.

* * * * *